US012512713B2

(12) United States Patent
Zhou et al.

(10) Patent No.: US 12,512,713 B2
(45) Date of Patent: Dec. 30, 2025

(54) MOTOR MAGNETIC COMPOSITE ENCODER

(71) Applicant: Nidec Motor Corporation, St. Louis, MO (US)

(72) Inventors: Liming Zhou, Chesterfield, MO (US); Mark E. Carrier, Wildwood, MO (US); Christopher D. Schock, Lake Saint Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 155 days.

(21) Appl. No.: 17/451,862

(22) Filed: Oct. 22, 2021

(65) Prior Publication Data

US 2023/0131131 A1   Apr. 27, 2023

(51) Int. Cl.
*G01D 5/245*    (2006.01)
*H02K 1/276*    (2022.01)
*H02K 1/2793*   (2022.01)
*H02K 11/215*   (2016.01)

(52) U.S. Cl.
CPC ......... *H02K 1/2793* (2013.01); *G01D 5/2454* (2013.01); *H02K 1/2773* (2013.01); *H02K 11/215* (2016.01)

(58) Field of Classification Search
CPC ...... H02K 1/2793; H02K 1/2773; H02K 1/02; H02K 9/06; H01K 11/215; G01D 5/2454; G01D 5/2455; G01D 5/2457; G01D 5/2458; G01D 5/142; G01D 5/145; G01D 5/147; G01D 5/16; G01D 5/165; G01D 5/2451; G01B 7/30; G01P 3/481; G01P 3/487; G01P 3/488; G01P 3/49

See application file for complete search history.

(56) References Cited

U.S. PATENT DOCUMENTS

| 4,464,935 | A | * | 8/1984  | McHugh    | G01H 1/003  |
|           |   |   |         |           | 73/462      |
| 5,258,735 | A |   | 11/1993 | Allwine, Jr. | |
| 5,313,159 | A |   | 5/1994  | Allwine, Jr. | |
| 5,382,900 | A | * | 1/1995  | Hayashi   | G01B 7/312  |
|           |   |   |         |           | 324/207.21  |
| 5,504,424 | A | * | 4/1996  | Graf      | G01D 5/2013 |
|           |   |   |         |           | 324/207.25  |
| 5,796,200 | A | * | 8/1998  | Sakashita | H02K 1/2791 |
|           |   |   |         |           | 310/67 R    |
| 6,249,071 | B1| * | 6/2001  | Lopatinsky | H02K 7/14  |
|           |   |   |         |           | 254/254     |
| 6,388,346 | B1| * | 5/2002  | Lopatinsky | H02K 1/2753|
|           |   |   |         |           | 417/423.1   |

(Continued)

OTHER PUBLICATIONS

The Timken Company webpage entitled "M11 Miniature Commutating Modular Magnetic Encoder" (https://www.timkenencoders.com/en-us/m11-miniature-commutating-modular-magnetic-encoder) (printed Mar. 30, 2022).

(Continued)

*Primary Examiner* — David M Schindler
(74) *Attorney, Agent, or Firm* — Hovey Williams LLP (57) ABSTRACT

An electric motor including a rotor defining an axis of rotation and an encoder. The encoder includes a magnetic composite part attached to the rotor, and a magnetic flux sensor positioned to detect magnetic flux resulting from movement of the magnetic composite part with rotation of the rotor.

9 Claims, 8 Drawing Sheets

(56) References Cited

U.S. PATENT DOCUMENTS

| | | | |
|---|---|---|---|
| RE45,526 E | 5/2015 | Grill et al. | |
| 2007/0205759 A1* | 9/2007 | Ito | G01P 3/443 |
| | | | 324/174 |
| 2009/0169403 A1* | 7/2009 | Tsai | H02K 1/145 |
| | | | 417/423.7 |
| 2011/0025310 A1* | 2/2011 | Moura | G01D 5/2451 |
| | | | 324/207.24 |
| 2018/0198389 A1* | 7/2018 | Strong | G01P 3/486 |

OTHER PUBLICATIONS

Citizen Micro Co., Ltd. webpage entitled Technical Data-Rotary Encoder (https://mic.citizen.co.jp/english/tec/encoder.html)) (printed Apr. 15, 2024).
Faulhaber, Encoders Technical Information (17th edition, 2022).

* cited by examiner

MOTOR MAGNETIC COMPOSITE ENCODER

BACKGROUND OF THE INVENTION

Field of the Invention

The present invention relates generally to an electric motor. More specifically, the present invention concerns a magnetic encoder that includes a magnetic composite part fixed relative to a rotor of the electric motor.

Discussion of the Prior Art

Speed detection for electric motors often relies on sensing voltage changes in control circuitry and/or mounting sensors that produce electrical signals in response to movement of ferromagnetic elements of conventional rotor components. Electrical signals generated by existing components to represent the rotational speed and/or position of a rotor often produce inaccurate results. In addition, such technologies may require significant additional space within internal motor areas to accommodate sensor components and/or higher-capacity controller processors to support speed detection.

SUMMARY

According to an aspect of the present invention, an electric motor is provided. The electric motor includes a rotor defining an axis of rotation and an encoder. The encoder includes a magnetic composite part attached to the rotor, and a magnetic flux sensor positioned to detect magnetic flux resulting from movement of the magnetic composite part with rotation of the rotor.

According to another aspect of the present invention, an encoder configured for mounting on an electric motor having a rotor defining an axis of rotation is provided. The encoder includes a magnetic composite part configured to be attached to the rotor and comprising magnetic composite material comprising a ferrite powder imbedded within a thermoplastic matrix. The encoder also includes a magnetic flux sensor configured to be positioned within the electric motor to detect magnetic flux resulting from movement of the magnetic composite part with rotation of the rotor.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Of particular note, conductive elements according to various aspects of the present invention may be utilized in a variety of armature assemblies and in dynamo-electric machines of all varieties. It will be understood by one having ordinary skill that the teachings presented herein in relation to a preferred embodiment that includes a motor may also be applied to such other dynamo-electric machines and applications. For instance, a rotating element of a dynamo-electric machine such as a generator may comprise an armature having one or more encoders associated therewith.

Figure 1:
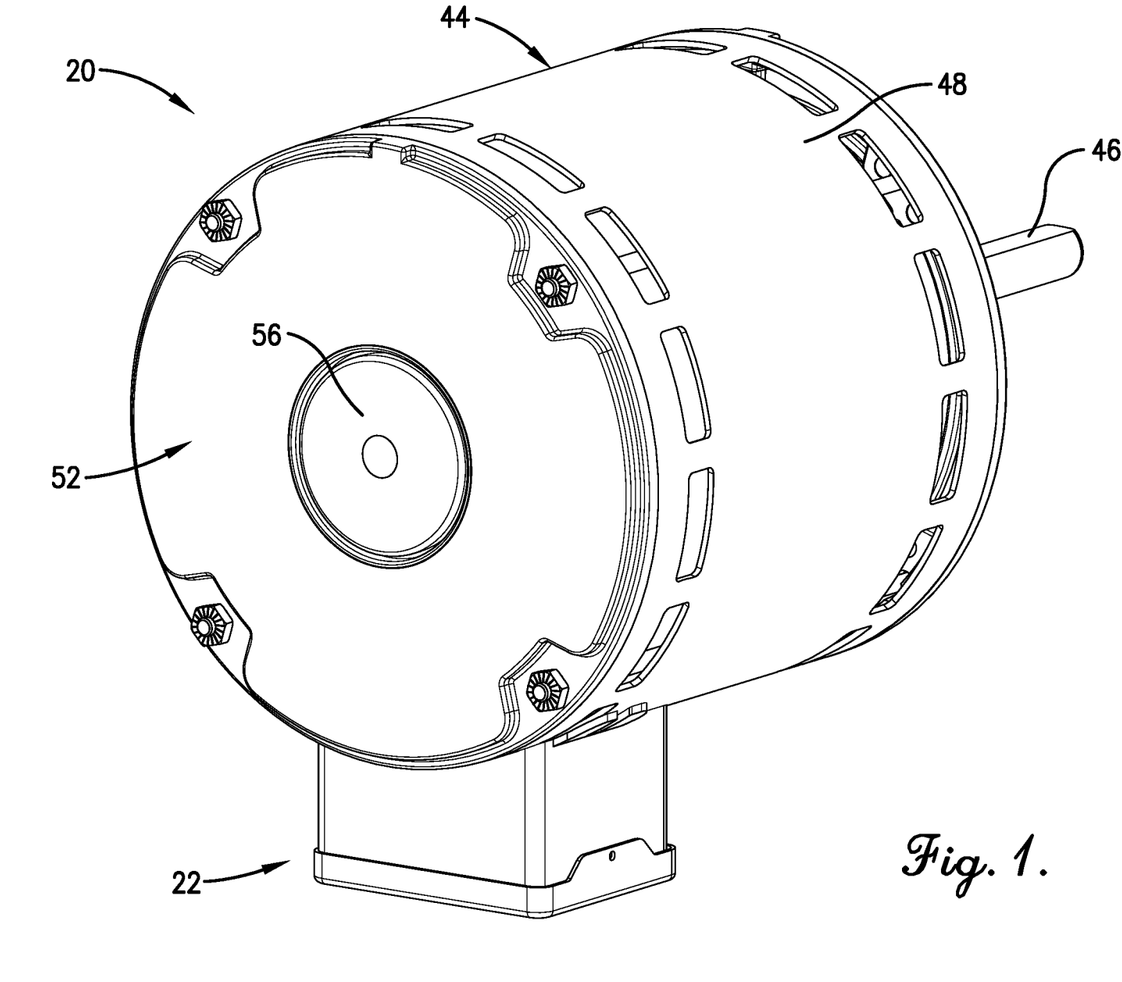
FIG. 1 is a rear perspective view of a motor, including a controller, constructed in accordance with the principles of an embodiment of the present invention.

Turning now to the embodiment illustrated in FIG. 1, an electric motor assembly 20 constructed in accordance with a preferred embodiment of the present invention is depicted. The motor assembly 20 includes a controller 22. One of ordinary skill will appreciate that a controller may be housed in variously configured housing and/or located elsewhere along a motor assembly or remotely without departing from the spirit of the present invention.

The exemplary motor assembly 20 may, for example and without limitation, be incorporated into fans, power tools, appliances, pumps, and/or electric vehicles. A wider variety of motor constructions and applications are, however, within the scope of the present invention.

Figure 2:
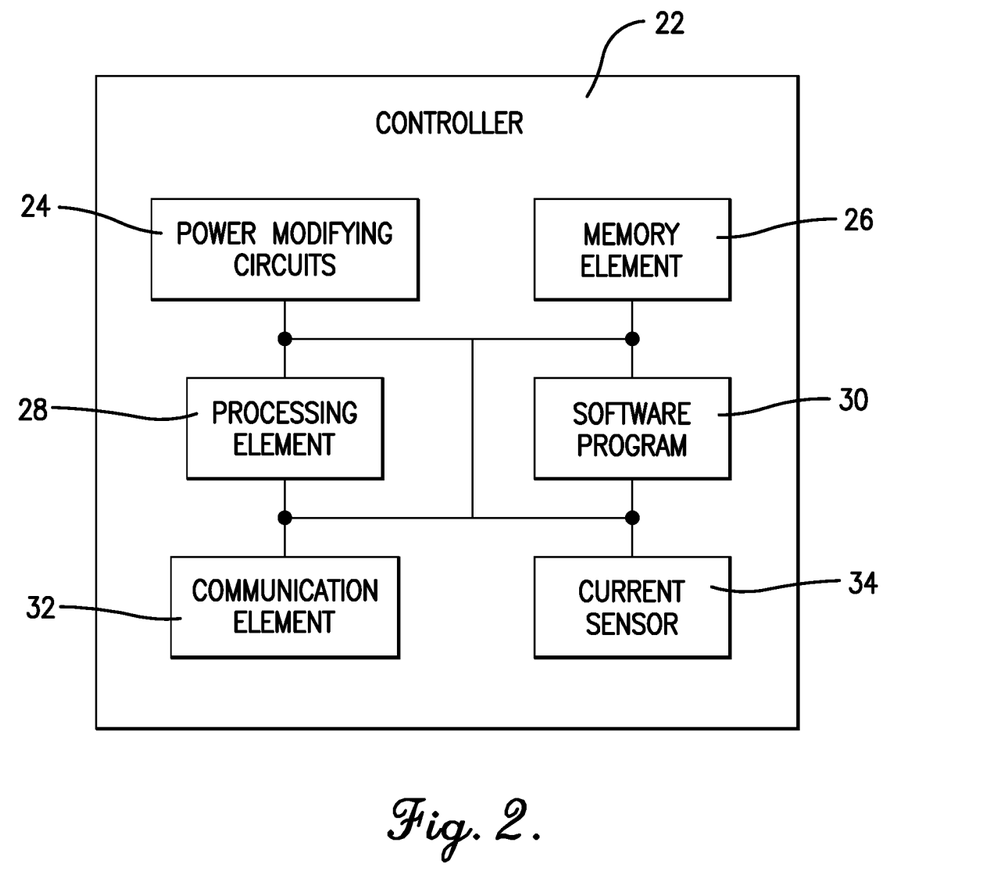
FIG. 2 illustrates in block schematic form various electronic components of an exemplary controller that may be used with the motor of FIG. 1.

Turning to FIG. 2, the controller 22 may include a power modifying circuit 24, a memory element 26, a processing element 28, a software program 30, a communication element 32, and a current sensor 34. One of ordinary skill will appreciate that a controller may include more or fewer electronic components without departing from the spirit of the present invention. Moreover, it should be appreciated that, in one or more embodiments, one or more components of a controller may be mounted elsewhere along a motor assembly and/or located remotely within the scope of the present invention.

The power modifying circuit 24 may include or comprise a power supply, a driver, an amplifier, a rectifier, an inverter, a switch, a starter, and/or other known components for receiving, modifying and/or supplying electrical currents to armature coils and windings of the motor assembly 20, as is generally known in the art. The controller 22 and power modifying circuit(s) 24 may comprise a variable frequency drive (VFD) or variable speed drive (VSD), which may exhibit a greater need for higher resolution and/or otherwise improved speed detection data available according to embodiments of the present invention.

The memory element 26 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 26 may include, or may constitute, a "computer-readable medium." The memory element 26 may store the instructions, code, code segments, software, firmware, programs, applications, apps, services, daemons, or the like that are respectively executed by the processing element 28. The memory element 26 may comprise non-volatile memory areas for storing program 30. The memory element 26 may also store, for example, settings, data and databases.

The processing element 28 may include one or more processors. The processing element 28 may include microprocessors, microcontrollers, DSPs, field-programmable gate arrays (FPGAs), analog and/or digital application-specific integrated circuits (ASICs). The processing element 28 may include digital processing unit(s). The processing element 28 may include combinations of any of the foregoing. The processing element 28 may generally execute, process, or run instructions, code, code segments, software, firmware, programs, applications, apps, processes, services, daemons, or the like. The processing element 28 may also include hardware components, such as finite-state machines, comparators, sequential and combinational logic, and other electronic circuits that may perform the functions necessary for the operation of embodiments of the current inventive concept. The processing element 28 may be in communication with the other electronic components through serial or parallel links that include address busses, data busses, control lines, and the like.

The communication element 32 may allow communication of components of the controller 22 with one or more encoder magnetic flux sensor(s) of the motor assembly 20 (discussed in more detail below) and/or with external systems or devices. The communication element 32 may include signal or data transmitting and receiving circuits, such as antennas, amplifiers, filters, mixers, oscillators, digital signal processors (DSPs), and the like. The communication element 32 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth®, or combinations thereof. Alternatively, or in addition, the communication element 32 may establish communication through connectors or couplers that receive metal conductor wires or cables including, without limitation, wiring electrically connected to, and for receiving analog and/or digital electrical signals from, leads 35 (FIG. 10) of magnetic flux sensor(s). The communication element 32 may also or alternatively establish communication through connectors or couplers that receive metal conductor wires or cables compatible with networking technologies such as ethernet. The communication element 32 may be in communication with or electronically coupled to memory element 26 and/or processing element 28.

The current sensor 34 may be a secondary sensor, and may comprise an integral component of the processing element 28 and/or a separate circuit for sensing current through the power modifying circuit 24, the sensed electrical signals being indicative of motor operation (including, for example, speed). One of ordinary skill will appreciate that other types of secondary sensors may be utilized to measure motor operation in embodiments of the present invention, including without limitation optical encoders mounted through a shaft of the motor (discussed below) and/or Hall effect sensor(s) mounted near the rotor and/or stator (also discussed below).

Turning more generally to FIGS. 1 and 3-5, as is customary, the motor assembly 20 broadly includes a rotor assembly 36, which is rotatable about an axis 38, and a stator assembly 40. The rotor assembly 36 and the stator assembly 40 are both contained within an internal motor chamber 42 that is defined by a motor case 44. One of ordinary skill will appreciate that a rotor assembly and a stator assembly may be of a variety of complementary constructions—such as those associated with direct current (DC) motors, synchronous motors and/or phase induction motors—within the scope of the present invention. In one or more embodiments, a motor assembly may be an interior permanent magnet, switch reluctance, synchronous reluctance and/or servo motor. Accordingly, details regarding such construction(s) are generally omitted here for brevity.

The rotor assembly 36 includes an axially disposed shaft 46 that projects outwardly from an axial end of the motor case 44 as well as an end ring 47 along an opposite axial end of the rotor assembly 36. The end ring 47 may be constructed from conductive metals and/or metal alloys such as, for example, copper, aluminum, or brass.

Figure 3:
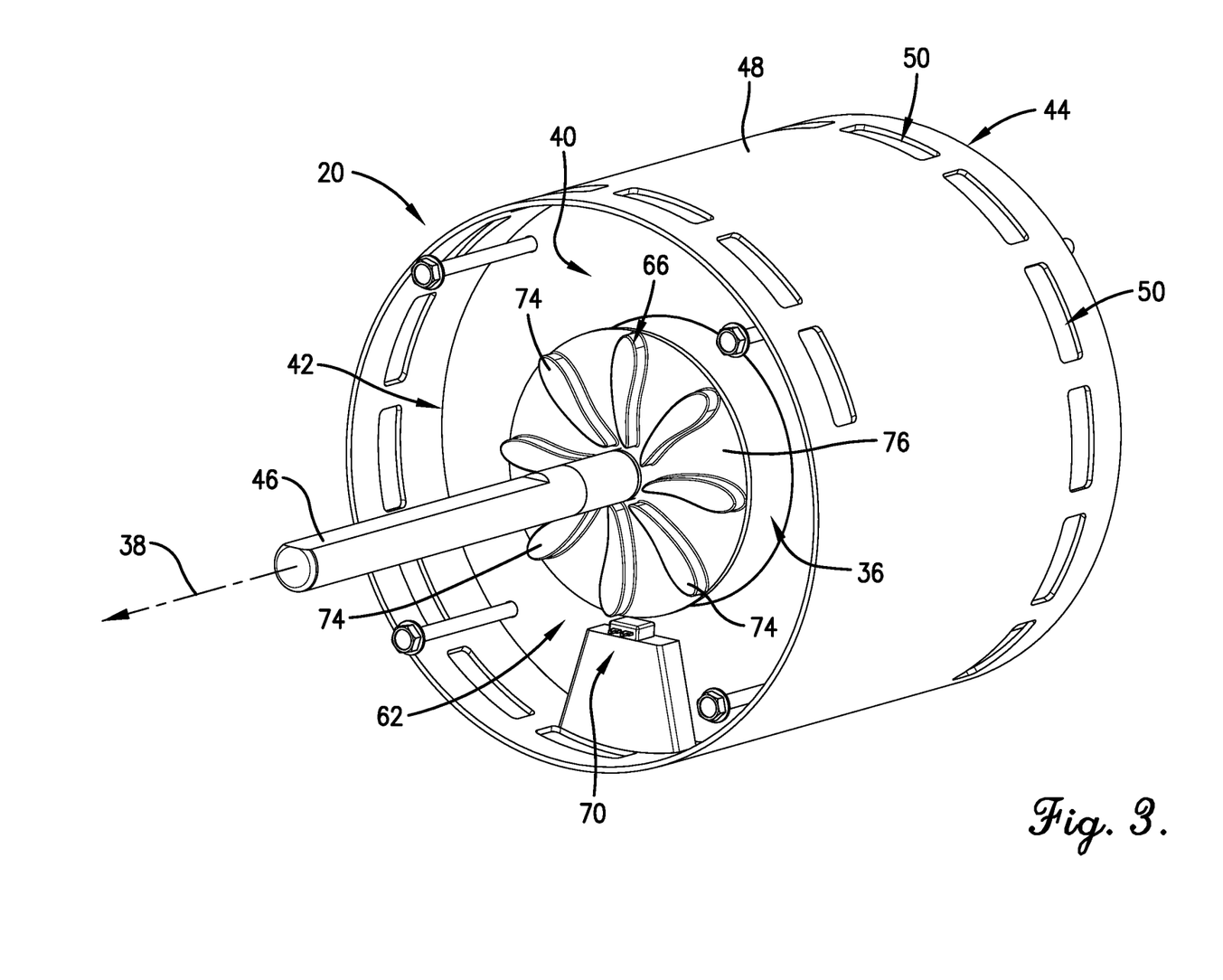
FIG. 3 is a partial front perspective view of an embodiment of the motor of FIG. 1 with a front endshield removed to reveal an encoder including a magnetic composite part having a first configuration mounted to a rotor.
Figure 4:
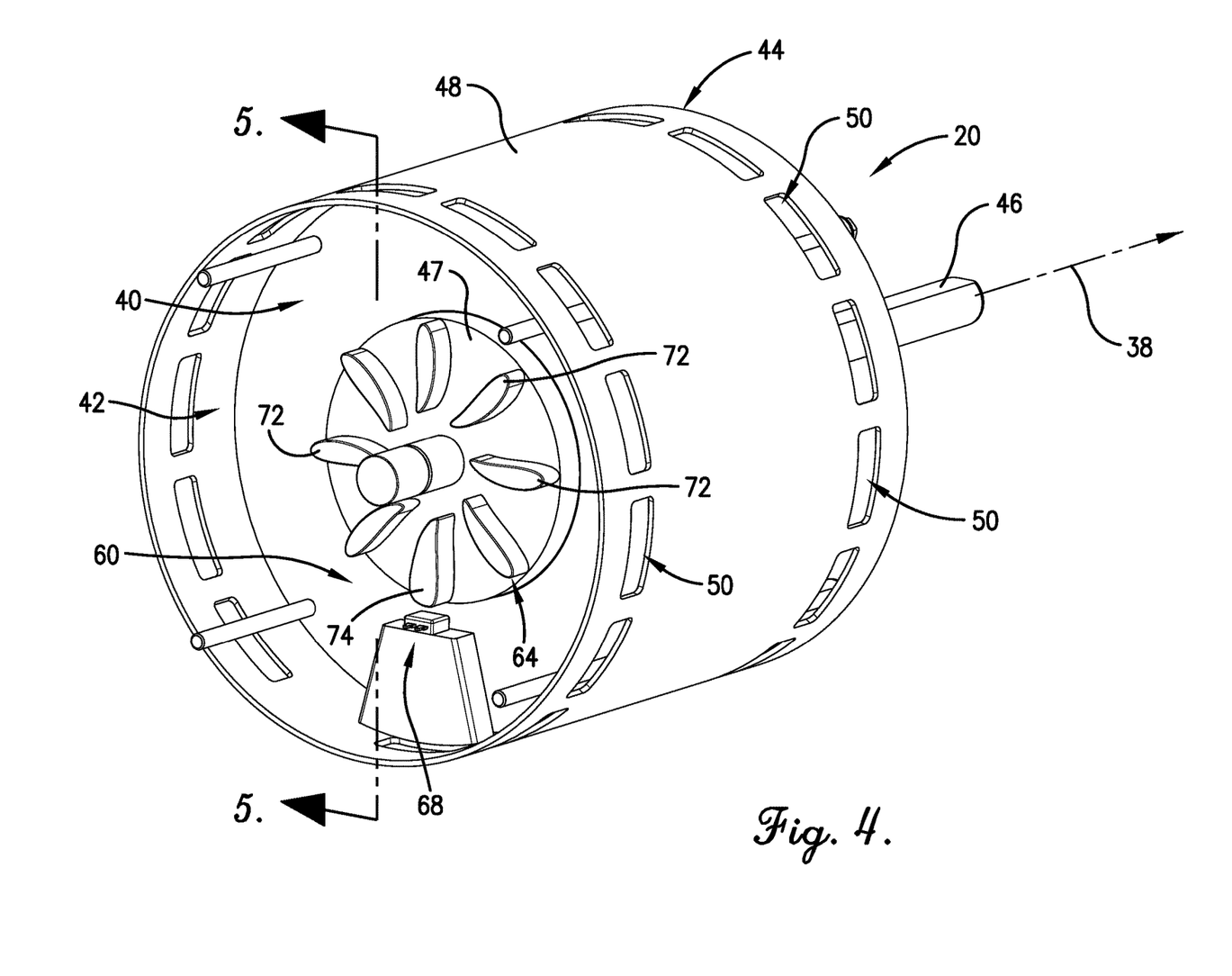
FIG. 4 is a partial rear perspective view of the embodiment of the motor of FIG. 3 with a rear endshield removed to reveal an encoder including a magnetic composite part having a second configuration mounted to the rotor.
Figure 5:
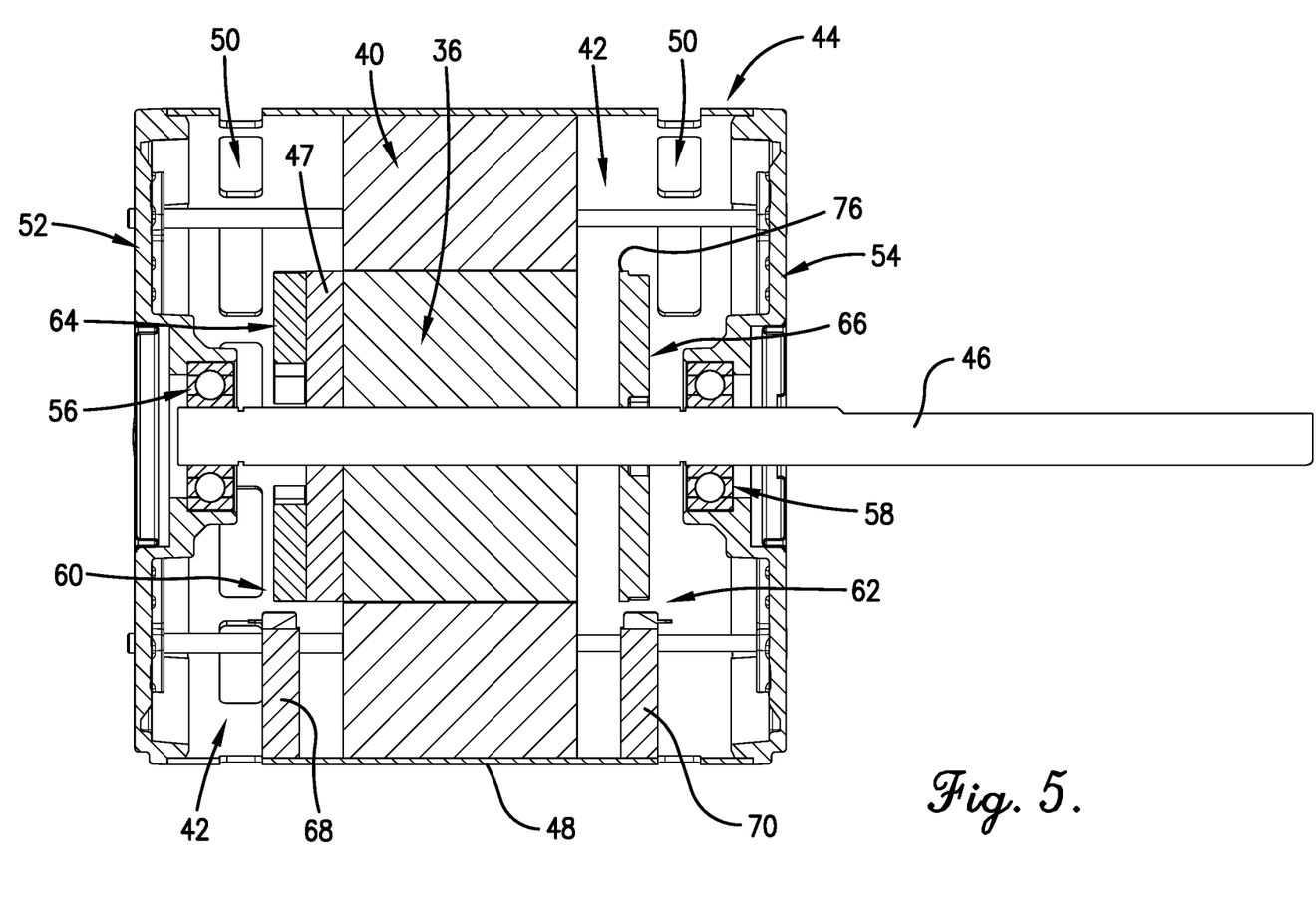
FIG. 5 is a cross-sectional side view of the motor of FIG. 3, taken along line 5-5 of FIG. 4.
Figure 6:
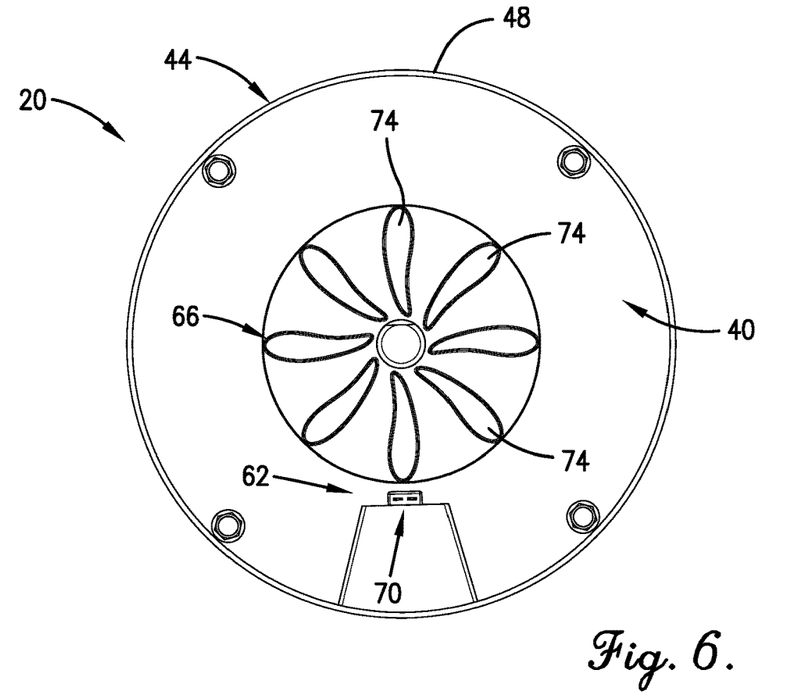
FIG. 6 is a front view of the motor of FIG. 3, illustrating the magnetic composite part having the first configuration in additional detail, including a fan disc molded integrally with a plurality of fan blades.
Figure 7:
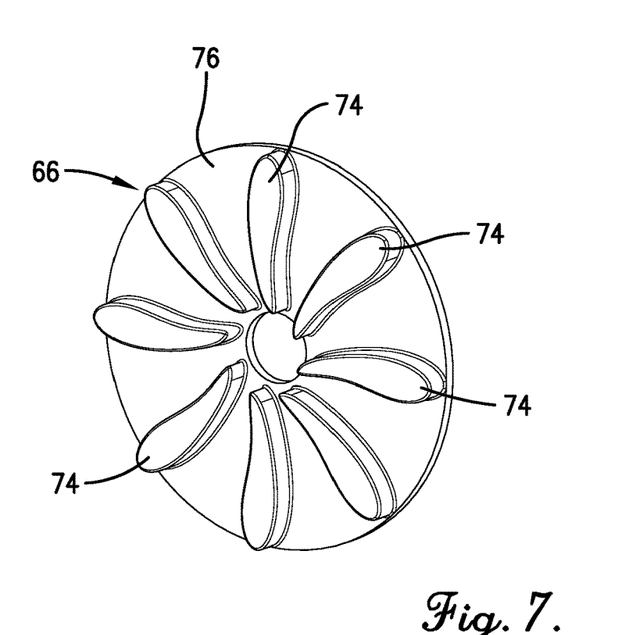
FIG. 7 is a front perspective view of the magnetic composite part of FIG. 6.

The stator assembly 40 is secured to the motor case 44 in a manner that limits or prevents rotation of the stator assembly 40 relative to the case 44. The rotor assembly 36 is mounted in a manner that allows it to rotate relative to the stator assembly 40 (and the case 44) about the axis 38. Various techniques and structures that are well known in the art can be used to mount the rotor assembly 36 and stator assembly 40 in the case 44. Thus, these techniques and structures will not be described in detail herein.

The motor case 44 is generally cylindrical and comprises a shell element 48 that includes a plurality of vent openings 50 disposed around a radially outer margin of the shell 48 to present a vented shell 48. It will be appreciated by one of ordinary skill in the art, however, that the alternative use of a non-vented shell (not shown) is clearly within the ambit of the present invention.

The motor case 44 further comprises endshields 52, 54 disposed adjacent axial end margins of and are secured to the shell 48. Each endshield 52, 54 may be secured to the shell 48 with a plurality of fasteners comprising bolts. However, it will be readily appreciated by one of ordinary skill in the art that either or both of the endshields 52, 54 could be alternatively secured to the shell 48, such as by welding or being integrally formed therewith, without departing from the teachings of the present invention.

The endshields 52, 54 are substantially similar to each other in many respects. One of ordinary skill will appreciate that, in one or more embodiments, one or both endshields may include vent openings (not shown) within the scope of the present invention. Such vent openings may permit vent air to flow in a generally axial direction to be exchanged between the ambient environment and inside a motor chamber to cool a motor assembly from heat generated during operation.

While only one embodiment is depicted here in detail, alternative cooling and/or venting arrangements, including a totally enclosed motor having a non-vented shell (not shown), are contemplated and are clearly within the ambit of the present invention.

Bearing assemblies 56, 58 (see FIG. 5) are also operably associated with respective radially central portions of each endshield 52, 54 for rotatably supporting the shaft 46. Each bearing assembly 56, 58 is preferably integrally formed with and/or attached to radially central portions of each corresponding endshield 52, 54, providing bearing surfaces supporting the shaft 46 as it rotates. Properly functioning bearing assemblies 56, 58 preferably provide rotational support in a manner that reduces or eliminates deflection of the shaft 46 away from the axis 38.

As will be readily appreciated by one of ordinary skill in the art, various aspects of the depicted motor case 44, including the endshields 52, 54, and/or of the rotor and stator assemblies 36, 40, may take alternative forms without departing from the teachings of the present invention and will not be discussed in further detail herein.

The motor assembly 20 of embodiments of the present invention includes encoders 60, 62. The encoders 60, 62 respectively include magnetic composite parts 64, 66 and magnetic flux sensors 68, 70. The magnetic composite parts 64, 66 respectively include pluralities of segments 72, 74 arcuately spaced about the shaft 46. Each of the pluralities of segments 72, 74 is configured to interact with a respective one of the magnetic flux sensors 68, 70 through an electromagnetic field. That is, the magnetic flux sensors 68, 70 are positioned and configured such that passage of segments of the corresponding plurality of segments 72, 74 into and out of proximity generates changes in magnetic flux density in the magnetic flux sensor 68 or 70 which are converted into corresponding and representative magnetic flux signals. In one or more embodiments, the magnetic flux sensors 68, 70 may convert sensor output voltage to a reference voltage and/or may convert analog magnetic flux signals to digital (such as, for example, binary digits) for transmission to the controller 22. Also or alternatively, the analog magnetic flux signals may be transmitted to the controller 22.

Each segment of the pluralities of segments 72, 74 is constructed of and comprises magnetic composite material. The magnetic composite material of each of the pluralities of segments 72, 74 may comprise a ferrite powder imbedded within a thermoplastic matrix. The ferrite powder may be homogenously or substantially homogenously distributed throughout the thermoplastic matrix. In one or more embodiments, the ferrite powder is selected from the group consisting of: $\gamma\text{-Fe}_2\text{O}_3$, $\text{Co}^{2+}\text{-}\gamma\text{Fe}_2\text{O}_3$, $\alpha\text{-Fe}_2\text{O}_3$, $\text{BaO·6Fe}_2\text{O}_3$, $\text{PbO·6Fe}_2\text{O}_3$ and $\text{SrO·6Fe}_2\text{O}_3$. In one or more embodiments, the thermoplastic matrix may comprise a thermoplastic selected from the group consisting of: Acrylic, Acrylonitrile Butadiene Styrene, Polylactic Acid, Polycarbonate, Polyamide, Polyether Sulfone, Polyoxymethylene, Polyethylene, Polypropylene, Polyvinyl chloride. Each segment may be constructed from any combination of the foregoing ferrite powders and thermoplastics and/or any mixture thereof. Further, multiple such combinations and mixtures may be used with various segments of an encoder without departing from the spirit of the present invention. Additional details regarding options for magnetic composite materials in embodiments of the present invention are provided in Tables 1 and 2 below:

TABLE 1

Ferrite Powder Examples

| ID | Magnetic Material | Shape and Powder Size | $H_c$, Oe |
|---|---|---|---|
| 1 | $\gamma\text{-Fe}_2\text{O}_3$ | Acicular, length < 3 μm | 300-450 |
| 2 | $\text{Co}^{2+}\text{-}\gamma\text{Fe}_2\text{O}_3$ | Acicular, length < 250 μm | 450-650 |
| 3 | $\alpha\text{-Fe}_2\text{O}_3$ | Acicular, length < 250 μm | 1100-1500 |
| 4 | $\text{BaO·6Fe}_2\text{O}_3$ | Platelets, size < 25 μm | 800-2300 |
| 5 | $\text{PbO·6Fe}_2\text{O}_3$ | Platelets, size < 45 μm | 800-2300 |
| 6 | $\text{SrO·6Fe}_2\text{O}_3$ | Platelets, size < 45 μm | 800-2300 |

TABLE 2

Polymer Matrix Examples

| ID | Polymer Matrix (thermoplastic) | Melting Temperature, C. |
|---|---|---|
| 1 | Acrylic | 210-240 |
| 2 | Acrylonitrile Butadiene Styrene (ABS) | 190-270 |
| 3 | Polylactic Acid (PLA) | 180-200 |
| 4 | Polycarbonate (PC) | 97-110 |
| 5 | Polyamide (Nylon 6, 66, 11 and 12) | 190-300 |
| 6 | Polyether Sulfone (PES) | 200-238 |
| 7 | Polyoxymethylene (POM) | 190-210 |
| 8 | Polyethylene (PE) | 115-137 |
| 9 | Polypropylene (PP) | 130-171 |
| 10 | Polyvinyl chloride (PVC) | 100-260 |

The weight percentage of ferrite powder(s) present in magnetic composite material in one or more embodiments of the present invention may be between sixteen and thirty percent (16-30%), inclusive, with the remainder comprising a thermal plastic matrix. Moreover, in one or more embodiments, the particles of the ferrite powder(s) may be between two-tenths and six and two-tenths micrometers (0.2-6.2 μm) in diameter, inclusive. In one or more embodiments, the coercivity of the magnetic composite material may be between four hundred and three thousand (400-3,000) Oe. One of ordinary skill will appreciate that magnetic properties of the magnetic composite material are influenced by chemicals of ferrite, particle size and weight percent of ferrite powder(s) therein.

Each segment of the pluralities of segments 72, 74 is radially polarized—that is, polarized in the radial direction relative to the axis 38—for improved flux and detection thereof by the corresponding magnetic flux sensor 68, 70. The pluralities of segments 72, 74 may be polarized using known techniques when cast or formed and/or upon or following installation on the motor assembly 20. One of ordinary skill will appreciate that one or more segments may be polarized in a non-radial direction within the scope of the present invention. Polarization may be enabled by varying crystallographic orientation during curing, for example by applying magnetic fields thereto. Accordingly, multi-magnetic entities/domains may retain the applied direction of magnetization across a sharp magnetic saturation, with the polarized particles being isolated by the polymer matrix.

The digital or analog magnetic flux signal(s) representing a segment of the plurality of segments 72 may either be unique as compared to, or essentially indistinguishable from, those representing other segments of the plurality of segments 72. In one or more embodiments, some segments' corresponding signal(s) may be unique, while the remainder are indistinguishable from each other. The same may be said of the plurality of segments 74. Accordingly, the controller 22 may analyze the magnetic flux signals received from each of the magnetic flux sensors 68, 70 to determine various useful characteristics of operation of the motor assembly 20. For example, the controller 22 may analyze the magnetic flux signals to determine one or more of: (i) a speed of rotation of the rotor, (ii) a direction of rotation of the rotor, and (iii) a rotational position of the rotor.

The motor assembly 20 and the controller 22 may be variously configured to optimize determination of one or more of the aforementioned characteristics of operation. For example, high resolution speed determination may be achieved by increasing the number of segments in the pluralities of segments 72, 74. In one or more embodiments, segments separated by only thirty degrees 30°) will provide greater resolution than segments separated by forty-five degrees (45°).

For another example, determining a direction of rotation may be facilitated by polarizing the pluralities of segments 72, 74 so that, upon rotation, magnetic flux signals are produced in patterns that distinguish clockwise rotation from counterclockwise rotation. In one or more embodiments, the pluralities of segments 72, 74 may include segments polarized radially in opposite directions (for example, North and South) in a pattern such that the magnetic flux signals generated by rotation in a clockwise direction form a pattern different from that formed by rotation in a counterclockwise direction. For instance, rotation in a clockwise pattern may generate sensor output, in digital format, of 10010110 (with the "1's" corresponding to North direction polarity and the "0's" corresponding to South direction polarity). Correspondingly, rotation in a counterclockwise pattern may generate sensor output of 01101001. Detection of one pattern or the other will accordingly aid the controller 22 in determining a direction of rotation.

Figure 8:
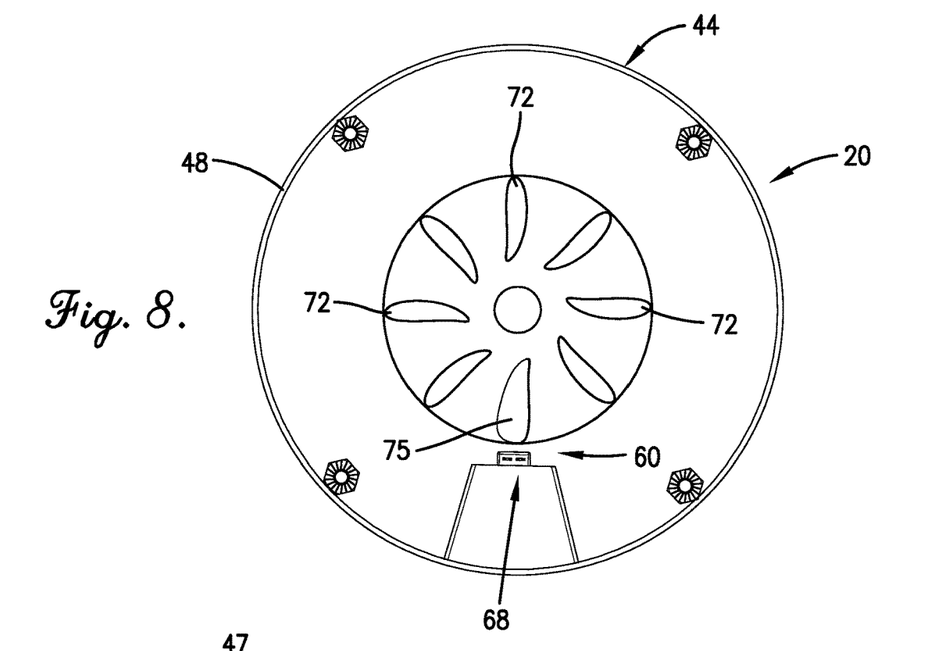
FIG. 8 is a rear view of the motor of FIG. 4, illustrating the magnetic composite part having the second configuration in additional detail, including a plurality of fan blades that are molded over or attached to an end ring.
Figures 9, 10:
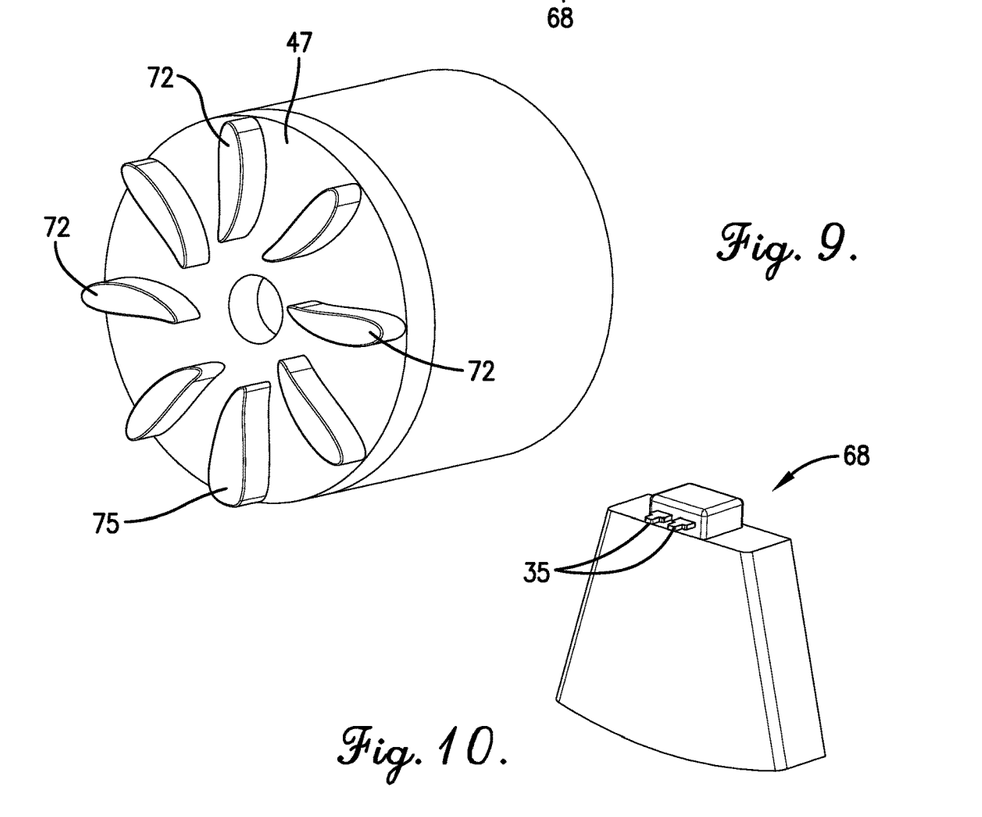
FIG. 9 is a rear perspective view of the magnetic composite part, end ring and a portion of the attached rotor of FIG. 8.
FIG. 10 is a rear perspective view of a magnetic flux sensor of the encoder of FIG. 4.

For still another example, unique patterns formed by subgroups of segments may be used as counters or the like, such that sensing the unique pattern once is indicative of rotational position and sensing the pattern twice permits the controller 22 to determine that a revolution has been made. In a similar fashion, at least one segment of the plurality of segments 72 may be shaped, polarized or otherwise configured to produce one or more magnetic flux signal(s) that are unique and distinguishable (for instance, with respect to amplitude and/or bandwidth) from the remainder of the segments of the plurality of segments 72, thereby serving as an incremental reference point that enables easier cycle or revolution counts and rotational position determinations. The same may be said about at least one unique and distinguishable segment of the plurality of segments 74. An exemplary unique segment 75 of the plurality of segments 72—which is larger and differently-shaped when compared against the remainder of the segments 72—is illustrated in FIGS. 4 and 8-9.

Determinations by the controller 22 based on the output of the magnetic flux sensors 68, 70, such as those described above, may be used for motor control functions. For example, such determinations may be used for feedback control. Moreover, such determinations may be used alone or in combination with other sensor output. In one or more embodiments, output from the current sensor 34 or another secondary sensor described above may be compared against or combined with the output of the magnetic flux sensors 68, 70 to improve operation of the motor assembly 20. For example, output from the current sensor 34 may be analyzed by the controller 22 to determine an estimated speed of rotation of the rotor assembly 36. Likewise, output from the magnetic flux sensors 68, 70 may be analyzed to determine a speed of rotation of the rotor assembly 36. If there is a disparity between the estimated speed and the determined speed, the estimated speed may be adjusted or corrected, and/or the current sensor 34 may be automatically re-calibrated, to reflect the correct determined speed.

One or both of the encoders 60, 62 may also be used to detect fretting of one or both of the bearing assemblies 56, 58. The magnetic composite parts 64, 66 are mounted and/or fixed relative to the shaft 46 axially between the rotor assembly 36 and the corresponding respective endshields 52, 54. Fretting of one of the bearing assemblies 56, 58 increases or otherwise changes the manner of deflection of the shaft 46 over time. Accordingly, deflection of the shaft 46 away from the axis 38 will cause corresponding deflections of the magnetic composite parts 64, 66 which may be detected by the magnetic flux sensors 68, 70. For example, changes in amplitude of magnetic flux signals generated by one or more segments of one or both of the pluralities of segments 72, 74 over time may be indicative of deflection of the shaft 46 which, in turn, may indicate fretting has occurred. Moreover, comparing differences between the sensed estimated deflection along one axial end of the rotor assembly 36—as determined by one of the magnetic flux sensors 68, 70—and the estimated deflection along the opposite axial end of the rotor assembly—as determined by the other of the magnetic flux sensors 68, 70—may permit better identification of which of the bearing assemblies 56, 58 is experiencing fretting, and to what degree. The controller 22 may transmit notifications or alerts relating to expected or detected fretting to external computing devices, for example via communication element 32.

One of ordinary skill will appreciate that making some or all of the determinations and calculations described or outlined herein may require initial storage and/or updating of data regarding the physical characteristics of the motor assembly 20. For example, the radius and/or outer circumference of the rotor assembly 36, the circumference and/or angular separation of the pluralities of segments 72, 74, the shortest distance between the pluralities of segments 72, 74 and respective magnetic flux sensors 68, 70, the axial distance between the pluralities of segments 72, 74 and respective ones of the bearing assemblies 56, 58, the polarity pattern(s) and/or amplitudes or other signal characteristics corresponding to the pluralities of segments 72, 74, and other physical characteristics of the motor assembly 20 may be stored on the memory element 26 upon construction or assembly and/or may be updated or corrected via the communication element 32 and/or based on sensor data from a secondary sensor and/or one or both the magnetic flux sensors 68, 70. Such stored data may be used—for example, by the processing element 28 executing a speed control program 30—in calculating, determining and controlling aspects of operation of the motor assembly 20 described herein.

The magnetic composite parts 64, 66 may be constructed in various shapes. Moreover, the magnetic composite parts 64, 66 may be fabricated by, for example, injection molding, compression, extrusion and/or three-dimensional (3D) printing. The encoders 60, 62 may be assembled with the remainder of the motor assembly 20 at an original equipment manufacturer and/or may be attached as after-market components to the motor assembly 20. The magnetic composite parts 64, 66 may be fixed to and/or relative to the shaft 46, and the magnetic flux sensors 68, 70 may be fixed to and/or relative to the shell 48, using, for example, adhesives, resin compounds, welding, or fasteners such as screws without departing from the spirit of the present invention.

Turning to FIGS. 3-4, two (2) distinguishable variations embodied by magnetic composite parts 64, 66 are illustrated. Namely, magnetic composite part 64 comprises a plurality of fan blades or fins, corresponding to the plurality of segments 72, which are formed from magnetic composite material and molded or over-molded onto the end ring 47. In contrast, magnetic composite part 66 comprises a plurality of fan blades or fins, corresponding to the plurality of segments 74, which are formed from magnetic composite material with a relatively thin fan disc 76. In one or more embodiments, the fan disc 76 may also comprise magnetic composite material and may be formed monolithically or integrally with the blades or fins of the plurality of segments 74.

The embodiment of FIGS. 1 and 3-9 therefore provide fan blades configured for rotation with the rotor assembly 36 to move cooling vent air through the vent openings 50 and around the chamber 42, and to otherwise circulate air within the chamber 42, in order to provide a cooling effect to the motor assembly 20. However, it is further noted that no fan blades and/or an independent cooling/fan system may be used without departing from the spirit of the present invention. For instance, some electric motors include passive cooling features, such as cooling fins and the like, to facilitate heat transfer out of the motor. Some electric motors include active cooling systems, such as a forced air ventilation systems. Active cooling systems and passive cooling features such as cooling fins can be used in combination.

Accordingly, embodiments of the present invention advantageously provide one or more encoders for motor control which also help cool the motor and/or are positioned and constructed to minimize the space within an interior motor chamber that is required for mounting and/or operation of the encoder(s). Moreover, in one or more embodiments, molded composite material(s) are non-conductive and exhibit excellent dialectical strength. Encoders constructed according to embodiments of the present invention may be more robust and/or less vulnerable to environmental conditions such as dust, debris, humidity change and temperature than alternatively available technologies.

It should be appreciated that more or fewer than two (2) encoders may be utilized without departing from the spirit of the present invention. For example, encoder 62 may be omitted without departing from the spirit of the present invention. For another example, encoder 60 may be omitted—with the corresponding blades or fins mounted to the end ring 47 being omitted or constructed of conventional materials—without departing from the spirit of the present invention.

Figure 11:
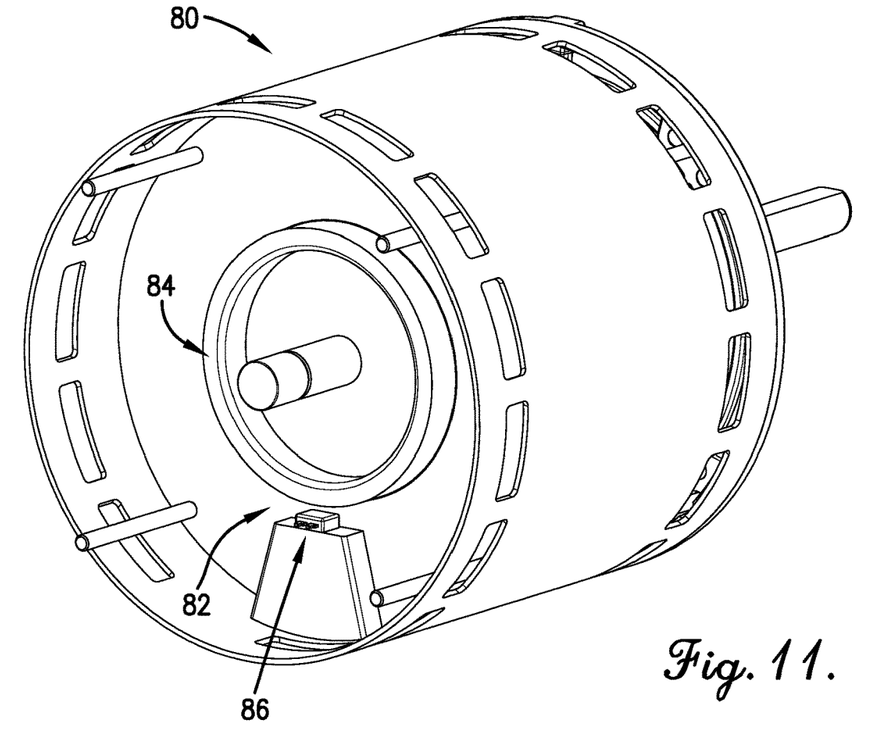
FIG. 11 is a partial rear perspective view of another embodiment of the motor of FIG. 1, with a rear endshield removed to reveal an encoder having a magnetic composite part of a third configuration mounted to a rotor.
Figure 12:
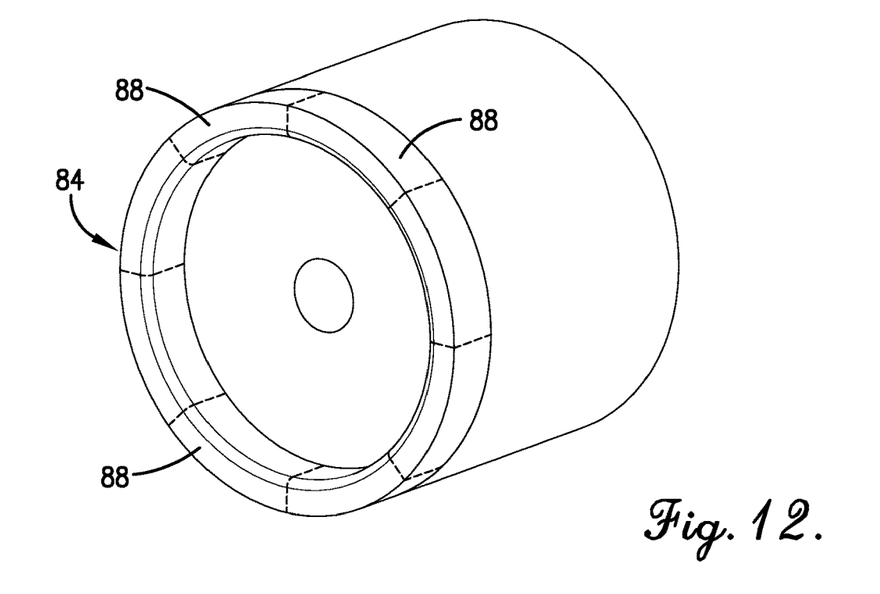
FIG. 12 is a rear perspective view of the magnetic composite part and a portion of the attached rotor of FIG. 11.

Turning now to a second embodiment of the present invention, FIGS. 11-12 illustrate a motor assembly 80 including an encoder 82 comprising a magnetic composite part 84 and a magnetic flux sensor 86. It is initially noted that, with certain exceptions discussed here, many of the elements of the motor assembly 80 of the second embodiment are the same as or very similar to those described in detail above in relation to the motor assembly 20 of the first embodiment. Therefore, for the sake of brevity and clarity, redundant descriptions and numbering will be generally avoided here. Unless otherwise specified, the detailed descriptions of the elements presented above with respect to the first embodiment of a motor assembly should therefore be understood to apply at least generally to the second embodiment, as well.

The magnetic composite part 84 comprises an end ring formed of magnetic composite material and has a plurality of segments 88. The plurality of segments 88 are magnetically (though perhaps not visibly) distinguishable. For ease of reference, broken lines are added to FIG. 12 to conceptually delineate the segments 88. The plurality of segments 88 may be magnetically distinguishable—and, accordingly, may induce generation of correspondingly distinguishable magnetic flux signals by the magnetic flux sensor 86—because of alternating or distinguishable radial polarization in the manner generally discussed in connection with magnetic composite parts 64, 66 above. For example, the circumferential center of each of the plurality of segments 88 may be radially polarized in either North or South directions and/or to a greater or lesser degree. The encoder 82 may be attached and utilized in the same or a substantially similar fashion to that described above in connection with encoders 60, 62. It should also be appreciated that the encoder 82 may be used with one or more additional encoders without departing from the spirit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor comprising:
a rotor defining an axis of rotation and including a shaft extending along the axis of rotation;
a substantially continuous annular end ring fixed relative to the shaft;
a stator, the rotor and the stator being in an inner rotor configuration;
a bearing rotatably receiving and supporting the shaft;
an encoder including
a magnetic composite part attached to the rotor, fixed relative to the shaft, and including a plurality of segments arcuately spaced about the shaft, the plurality of segments being fixed to the substantially continuous annular end ring and including a plurality of corresponding inner ends and a plurality of corresponding lengths extending radially outward away from the shaft, with the substantially continuous annular end ring extending radially outward away from the shaft beyond the plurality of inner ends and at least partially along the plurality of lengths, a magnetic flux sensor positioned to detect magnetic flux resulting from movement of the magnetic composite part with rotation of the rotor, with each of the plurality of segments being polarized radially and causing generation of a magnetic flux signal by the magnetic flux sensor when brought into proximity with the magnetic flux sensor; and a controller including a communication element, a processing element and non-transitory computer-readable media having computer-readable instructions instructing the processing element to identify changes in the magnetic flux signals over time indicative of fretting of the bearing and to generate a resultant alert for transmission via the communication element of the controller, said magnetic flux signals generated by the plurality of segments conforming to at least three (3) distinguishable signal patterns including: a magnetic North radially polarized pattern, a magnetic South radially polarized pattern, and a unique radially polarized pattern, the unique radially polarized pattern being generated by one of the plurality of segments having dimensions not shared by any other of the plurality of segments, said plurality of segments being arranged so that the at least three (3) distinguishable signal patterns are generated at the magnetic flux sensor in a first order when the rotor rotates in a first direction and a second order when the rotor rotates in a second direction.

2. The electric motor as claimed in claim 1,
the magnetic composite part comprising magnetic composite material comprising a ferrite powder imbedded within a thermoplastic matrix.

3. The electric motor as claimed in claim 2,
the ferrite powder being selected from the group consisting of: $\gamma\text{-Fe}_2\text{O}_3$; $Co^{2+}\text{—}\gamma\text{Fe}_2\text{O}_3$; $\alpha\text{-Fe}_2\text{O}_3$; $BaO.6Fe_2O_3$; $PbO.6Fe_2O_3$; $SrO.6Fe_2O_3$,
the thermoplastic matrix comprising a thermoplastic selected from the group consisting of:
Acrylic, Acrylonitrile Butadiene Styrene, Polylactic Acid, Polycarbonate, Polyamide, Polyether Sulfone, Polyoxymethylene, Polyethylene, Polypropylene, Polyvinyl chloride.

4. The electric motor as claimed in claim 1, further comprising a motor housing,
the rotor shaft having first and second opposite axial ends,
the magnetic composite part being attached to the rotor shaft adjacent the first axial end,
the magnetic flux sensor being fixed relative to the motor housing adjacent the first axial end,
the magnetic composite part being formed by one of: injection molding, compression, extrusion and three-dimensional (3D) printing.

5. The electric motor as claimed in claim 1, the computer-readable instructions further instructing the processing element to perform the following steps— analyze the magnetic flux signals to determine one or more of: (i) a speed of rotation of the rotor, (ii) a direction of rotation of the rotor, and (iii) a rotational position of the rotor.

6. The electric motor of claim 1, the plurality of segments being molded or over-molded onto the substantially continuous annular end ring.

7. An electric motor comprising:
a rotor defining an axis of rotation and including a shaft extending along the axis of rotation;
a stator, the rotor and the stator being in an inner rotor configuration;
a bearing rotatably receiving and supporting the shaft;
an encoder including—
a magnetic composite part attached to the rotor, fixed relative to the shaft, and including a fan disc and a plurality of segments arcuately spaced about the shaft, the plurality of segments being fixed to the fan disc and including a plurality of corresponding inner ends and a plurality of corresponding lengths extending radially outward away from the shaft, with the fan disc extending radially outward away from the shaft beyond the plurality of inner ends and at least partially along the plurality of lengths,
a magnetic flux sensor positioned to detect magnetic flux resulting from movement of the magnetic composite part with rotation of the rotor, with each of the plurality of segments being polarized radially and causing generation of a magnetic flux signal by the magnetic flux sensor when brought into proximity with the magnetic flux sensor; and
a controller including a communication element, a processing element and non-transitory computer-readable media having computer-readable instructions instructing the processing element to identify changes in the magnetic flux signals over time indicative of fretting of the bearing and to generate a resultant alert for transmission via the communication element of the controller,
said magnetic flux signals generated by the plurality of segments conforming to at least three (3) distinguishable signal patterns including: a magnetic North radially polarized pattern, a magnetic South radially polarized pattern, and a unique radially polarized pattern, the unique radially polarized pattern being generated by one of the plurality of segments having dimensions not shared by any other of the plurality of segments,
said plurality of segments being arranged so that the at least three (3) distinguishable signal patterns are generated at the magnetic flux sensor in a first order when the rotor rotates in a first direction and a second order when the rotor rotates in a second direction.

8. The electric motor of claim 7, the magnetic composite part comprising magnetic composite material comprising a ferrite powder imbedded within a thermoplastic matrix.

9. The electric motor of claim 7, the plurality of segments being molded integrally with the fan disc.

* * * * *